US010631177B1

(12) United States Patent
Bellinder et al.

(10) Patent No.: US 10,631,177 B1
(45) Date of Patent: Apr. 21, 2020

(54) MOBILE PHONE CHIPSET PARAMETER ADAPTATION FRAMEWORK

(71) Applicant: Sprint Communications Company L.P., Overland Park, KS (US)

(72) Inventors: Benjamin E. Bellinder, Olathe, KS (US); Jagannath Ghoshal, Olathe, KS (US); Dale S. Schempp, Lenexa, KS (US); Simon Youngs, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 158 days.

(21) Appl. No.: 15/475,131

(22) Filed: Mar. 31, 2017

(51) Int. Cl.
*H04W 24/02* (2009.01)
*H04B 1/3816* (2015.01)
*H04W 12/06* (2009.01)
*H04L 29/08* (2006.01)
*H04W 76/11* (2018.01)
*H04L 29/12* (2006.01)

(52) U.S. Cl.
CPC .......... *H04W 24/02* (2013.01); *H04B 1/3816* (2013.01); *H04L 67/34* (2013.01); *H04W 12/06* (2013.01); *H04W 76/11* (2018.02); *H04L 61/6054* (2013.01)

(58) Field of Classification Search
CPC ........ H04W 24/02; H04W 76/11; H04L 67/34
See application file for complete search history.

(56) References Cited

U.S. PATENT DOCUMENTS

| | | | | |
|---|---|---|---|---|
| 8,311,516 B2* | 11/2012 | Kim | ................. | H04N 21/25808 348/552 |
| 2003/0027581 A1* | 2/2003 | Jokinen | ................... | H04W 8/04 455/456.1 |
| 2012/0066767 A1* | 3/2012 | Vimpari | ................ | H04L 9/0866 726/26 |
| 2015/0140987 A1* | 5/2015 | Matsuoka | ............... | H04W 4/50 455/418 |
| 2016/0036956 A1* | 2/2016 | Debates | ................ | G06F 16/951 455/419 |
| 2017/0208443 A1* | 7/2017 | Gupta | ...................... | H04W 4/16 |
| 2017/0295491 A1* | 10/2017 | Gehrmann | ............ | H04W 12/06 |

* cited by examiner

*Primary Examiner* — Muthuswamy G Manoharan (57) ABSTRACT

A method of configuring hardware parameter values of a user equipment (UE) after distribution to an end user. The method comprises identifying an electronic chip that comprises a component in the UE by a carrier application that executes on the UE, where the carrier application is configured with wireless communication service provider access permissions, transmitting a request for preferred hardware parameter values by the carrier application to a device management server, where the request comprises the identity of the electronic chip, receiving preferred hardware parameter values by the carrier application from the device management server, and, based on the received preferred hardware parameter values, setting a hardware parameter value of the electronic chip to the corresponding preferred hardware parameter value, whereby the UE is configured for optimized wireless communication in a radio access network.

19 Claims, 6 Drawing Sheets

MOBILE PHONE CHIPSET PARAMETER ADAPTATION FRAMEWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

User equipments (UEs) may comprise electronic chips, for example radio modem chips, that have a variety of hardware parameters that may be used to adapt radio performance for use in a specific radio access network (RAN). For example, an original equipment manufacturer (OEM) may make chips that are used in UEs that are operated in different RAN infrastructures (e.g., RANs operated by different wireless service providers). A first wireless service provider may purchase 100,000 units of a UE for use in a first RAN; and a second wireless service provider may purchase 150,000 units of the same model of UE for use in a second RAN. Because the two RANs may be different, the OEM may desirably configure a first set of preferred hardware parameter values into the UEs for use in the first RAN and configure a second set of preferred hardware parameter values into the UEs for use in the second RAN. For example, the frequency band used for wireless communication in the first RAN may be different enough from the frequency band used for wireless communication in the second RAN that different hardware parameter values can provide more optimized wireless communication performance in the different RANs.

SUMMARY

In an embodiment, a user equipment is disclosed. The user equipment comprises a processor, a non-transitory memory, a cellular radio transceiver, a physical layer application stored in the non-transitory memory, and a carrier application stored in the non-transitory memory. When executed by the processor, the physical layer application receives a request to set a hardware parameter value of the cellular radio transceiver, where the request comprises a secure access credential from a carrier application, authorizes the request to set the hardware parameter value based on validating the secure access credential, and sets the hardware parameter value to the value identified in the request. When executed by the processor, the carrier application determines an identity of the cellular radio transceiver, transmits a request for preferred hardware parameter values of the cellular radio transceiver via the cellular radio transceiver to a device management computer system, where the request for preferred hardware parameter values comprises the identity of the cellular radio transceiver, receives a set of preferred hardware parameter values of the cellular radio transceiver via the cellular radio transceiver, and sends the request to set the hardware parameter value of the cellular radio transceiver to the physical layer application, where the request comprises a preferred hardware parameter value.

In another embodiment, a method of configuring hardware parameter values of a user equipment after distribution to an end user is disclosed. The method comprises identifying an electronic chip that comprises a component in the UE by a carrier application that executes on the UE, where the carrier application is configured with wireless communication service provider access permissions, transmitting a request for preferred hardware parameter values by the carrier application to a device management server, where the request comprises the identity of the electronic chip, receiving preferred hardware parameter values by the carrier application from the device management server, and, based on the received preferred hardware parameter values, setting a hardware parameter value of the electronic chip to the corresponding preferred hardware parameter value, whereby the UE is configured for optimized wireless communication in a radio access network.

In yet another embodiment, a system is disclosed. The system comprises a user equipment and a removable electronic identity module, where the removable electronic identity module comprises an identity of a wireless communication service provider and a secure access credential. The user equipment, comprises a processor, a non-transitory memory, a cellular radio transceiver, a physical layer application stored in the non-transitory memory, and a carrier application stored in the non-transitory memory. When executed by the processor, the physical layer application receives a request to set a hardware parameter value of the cellular radio transceiver, authorizes the request to set the hardware parameter value based on validating the secure access credential, and sets the hardware parameter value to the value identified in the request. When executed by the processor, the carrier application determines an identity of a cellular radio transceiver modem chip, obtains a set of preferred hardware parameter values of the cellular radio transceiver via the cellular radio transceiver, and sends the request to set the hardware parameter value to the cellular radio transceiver, where the request comprises a preferred hardware parameter value.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

User equipments (UEs), for example mobile smart phones, may be migrated from use in a first radio access network (RAN) operated by a first wireless service provider to use in a second RAN operated by a second wireless service provider, for example when a user moves his or her wireless communication subscription account from a first service provider to a second service provider. Because different RANs are configured differently, it may be desirable to modify the hardware parameters of one or more electronic chips in the migrated UE to assure that the UE performs as well as it can in the second RAN. A problem may arise, however, in changing hardware parameters ad hoc on individual UEs, because original equipment manufacturers (OEMs) typically reserve write access privilege to these hardware parameters to themselves. The OEMs reserve these write privileges to themselves because allowing open access to writing the hardware parameters would be a major security vulnerability. Any virus that found its way onto a device might hold the device and/or user of the device hostage or simply maliciously degrade or defeat the operation of the UE.

The present disclosure teaches a carrier application installed on the UE that is extended an application programming interface (API) by a low level of an operating system on the UE. The API provides parameter setting methods that the carrier application can access to change hardware parameter values. The API methods may expect the carrier application to provide a secure access credential as a prerequisite to writing to the hardware parameter. Alternatively, the API method may reach out to a secure memory location, for example to a secure element in a removable subscriber identity module (SIM) or to a secure element in a removable universal integrated circuit card (UICC), to obtain the secure access credential. In this way, the UE can be secured against un-credentialed malware exploiting the API to hold the UE hostage or to maliciously degrade or defeat operation of the UE while still allowing the credentialed carrier application to desirably adapt the hardware parameter values of the UE.

The use of an on-board application, the carrier application, to use the API to adapt hardware parameter values versus relying on an application executing on a central server to adapt the hardware parameter values may provide some advantages of increased security versus invoking the API extended by the low level of the operating system of the UE. For example, when the API is invoked locally (e.g., by the carrier application executing on the UE) the API methods may not be sniffed over the Internet, captured, and then spoofed via the Internet. Getting access to the UE by malware to attempt to break the security model of updating hardware parameter values may be more difficult than sniffing and spoofing API method messages flowing on the Internet. The use of the on-board application may have the further benefit of implementing this solution on a legacy UE, for example a UE that was not built with this behavior (e.g., the carrier application) pre-installed. In this case, the carrier application can be installed over-the-air into the UE on an as-needed basis. It is thought that this solution is more efficient than a centralized computing solution. Alternatively, this solution can be analyzed as distributing at least some of the burden of processing from a central server to the possibly idle or only partially loaded processors of the UEs.

The carrier application may perform an inventory of hardware components of the UE, for example on the event of activating the UE to a different RAN or on the event of first execution of the carrier application after downloading and installing the carrier application on the UE (for example, when the UE is migrated to a different wireless communication service). The carrier application may learn the identity of a radio modem chip and other electronic chips of the UE. The carrier application sends a message requesting preferred hardware parameter values to a device management server, the message including the identity of one or more of the electronic chips of the UE. A device management parameter application executing on the device management server uses the electronic chip identities to look up preferred hardware parameter values. The device management parameter application further determines a service plan associated with the UE and uses this information along with the electronic chip identities to look up preferred hardware parameter values. The device management parameter application returns the preferred hardware values to the UE. In an embodiment, the preferred hardware parameters may be stored on the secure memory area, for example a SIM card or a UICC, and the carrier application may access the preferred parameter values from the secure memory area using the electronic chip identities and possibly additional information to select the appropriate set of preferred hardware parameter values.

The carrier application requests to set all the chip hardware parameter values to the values it receives from the device management parameter application (or reads from the secure memory area). Alternatively, the carrier application may first determine what existing chip hardware parameter values are, compare the existing parameter values to the preferred parameter values, and then request to set only those chip hardware parameter values where the preferred hardware parameter values are different from the existing chip hardware parameter values. In an embodiment, the device management server notifies a customer relationship management server of the changed UE hardware parameter values. The customer relationship management server may perform analysis of the UE and the subscription plan associated with UE and send a notification to the UE describing functionality that is now enabled by the revised UE hardware parameters. The notification may identify premium subscription plan options that are available to the UE that may promote more effective utilization of the updated hardware parameter values.

Figure 1:
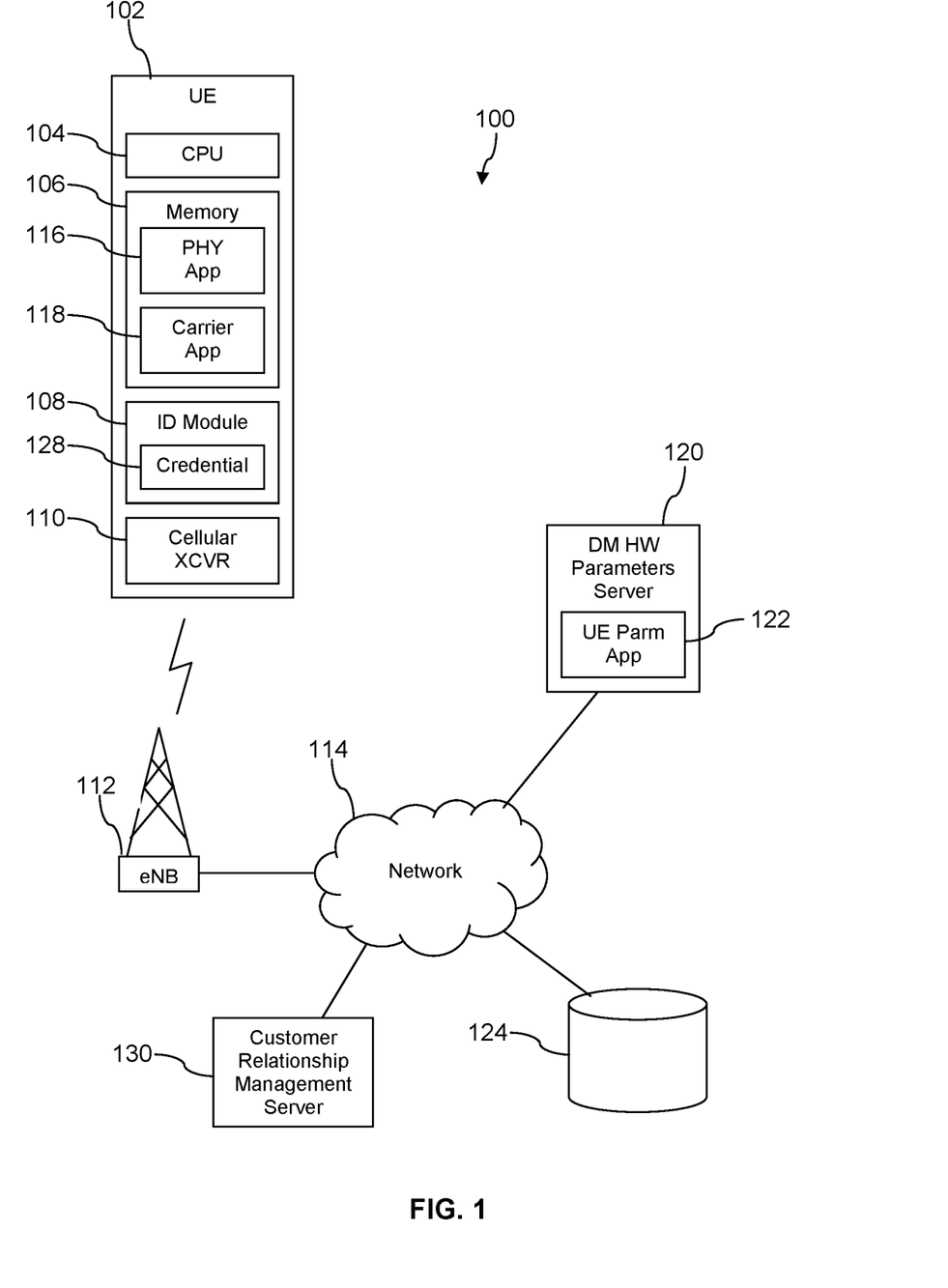
FIG. 1 is a block diagram of a communication system according to an embodiment of the disclosure.

Turning now to FIG. 1, a system 100 is described. In an embodiment, system 100 comprises a user equipment (UE) 102 having a processor 104, a memory 106, an identity module 108, and a cellular radio transceiver 110. The cellular radio transceiver 110 may establish a wireless communication link with a cell site 112 which communicatively couples the UE 102 to a network 114, for example to complete a voice call, to download content for display in a browser window, to download streamed video content, or to perform another communication function. The UE 102 may be a mobile phone, a mobile communication device, a smart phone, a media player, a personal digital assistant (PDA), a wearable computer, a headset computer, a laptop computer, a tablet computer, or a notebook computer. The cell site 112 may provide a wireless communication link to the UE 102 according to a long term evolution (LTE), a code division multiple access (CDMA), a global system for mobile communication (GSM), or a worldwide interoperability for microwave access (WiMAX) wireless communication protocol. The cell site 112 may be an enhanced node B (eNB), a base transceiver station (BTS), a picocell, or another wireless station.

The memory 106 may comprise a non-volatile memory storage portion. The memory 106, for example a non-volatile memory storage portion, may store a physical application 116 that comprises executable logic and/or instructions that may be considered to provide a software or firmware mediation layer that interacts with hardware devices in the UE 102. For example, the physical application 116 may provide device drivers for providing inputs to, receiving outputs from, and setting hardware operational parameters of hardware devices. The physical application 116 may provide drivers or methods to set hardware operational parameters for a radio modem chip associated with the cellular radio transceiver 110. This may be referred to as setting one or more hardware parameter values of a radio transceiver, for example the cellular radio transceiver 110. The physical application 116 may provide drivers or methods to set hardware operational parameters for other electronic chips that constitute the hardware of the UE 102. In some contexts the physical application 116 may be referred to as a physical layer application.

The memory 106, for example a non-volatile memory storage portion, may store a carrier application 118 that comprises executable logic and/or instructions that provide a variety of functions or operations specific to a wireless communication service provider or wireless carrier. The carrier application 118 may invoke an application programming interface (API) extended by the physical application 116 to configure hardware operational parameters of hardware devices, for example to configure hardware operational parameters of a radio modem chip. The carrier application 118 may be installed in the memory 106 during manufacturing of the UE 102, for example by an original equipment manufacturer (OEM) of the UE 102. Alternatively, the carrier application 118 may be downloaded and installed in the memory 106 after the UE 102 has been distributed to an end user or wireless communication service subscriber. For example, the carrier application 118 may be downloaded and installed in the memory 106 on the event of the UE 102 being migrated from a first wireless communication service provided by a first wireless communication service provider to a second wireless communication service provided by a second, different wireless communication service provider. The downloading may be initiated by a user of the UE 102 or initiated by service personnel pursuant to migrating the UE 102 from a first to a second wireless communication service account.

Conventionally OEMs may preconfigure hardware parameters into the UE 102 before shipping the UE 102 to end users or to wireless communication service providers for distribution to end users. The hardware parameters configured into the UE 102 may be distinctive to an anticipated target radio access network (RAN). For example, the OEM may configure a first set of hardware parameters into a first UE 102 targeted for deployment in a first RAN maintained by a first wireless communication service provider and configure a second set of hardware parameters into a second UE 102 targeted for deployment in a second RAN maintained by a second wireless communication service provider, notwithstanding that the first UE 102 and second UE 102 may be the same model or type of wireless communication device and intended for use with the same or similar wireless communication protocol or technology. The distinctive hardware parameters may permit the performance of an identical model of UE to be optimized for use in different RANs. Sometimes RANs change, and OEMs may develop and deploy a revised set of hardware parameters in a maintenance release delivered to thousands of UEs 102. When a single UE 102 is migrated to a second RAN (to service with a second wireless communication service provider), however, typically the hardware parameters remain configured as for use in the first RAN, which often may result in sub-optimal performance of the UE 102 when used in the second RAN. The OEM is unlikely to perform a maintenance release for a single migrated UE 102.

A large number of hardware parameters may be used by the UE 102 to configure operation of its hardware. For example, there may be hundreds of hardware parameters or thousands of hardware parameters associated with the operation of the hardware of the UE 102. As a short example, here are some hardware parameters associated with a cellular radio modem chip:

123^"FM TX AGC Adjust Setting vs Temperature"^"RF DFM*"

124^"FM Expected HDET Reading vs Power"^"RF DFM*"

125^"FM HDET Error Slope vs Power"^"RF DFM*"

126^"FM Frequency Gain"^"RF DFM*"

127^"CDMA Rx Linearizer Offset"^"RF CDMA*"

128^" CDMA Rx Linearizer Slope"^"RF CDMA*"

129^" CDMA Rx Gain Compensation vs Frequency"^"RF CDMA*"

130^"CDMA Tx Gain Compensation vs Frequency"^"RF CDMA*"

131^"CDMA Tx Gain Compensation vs Voltage"^"RF CDMA*"

132^" CDMA Tx Linearizer Master Offset"^"RF CDMA*"

133^" CDMA Tx Linearizer Master Slope"^"RF CDMA*"

134^"CDMA Tx Linearizer Trim vs Temperature"^"RF CDMA*"

135^"CDMA Tx Linearizer Trim vs Voltage"^"RF CDMA*"

136^" CDMA Tx Power Limit vs Temperature"^"RF CDMA*"

137^"CDMA Tx Power Limit vs Voltage"^"RF CDMA*"

138^" CDMA Tx Power Limit vs Frequency"^"RF CDMA*"

139^" CDMA Expected HDET Reading vs AGC PDM"^"RF CDMA*"

140^"CDMA HDET Error Slope vs HDET Reading"^"RF CDMA"

141^"RF LCD Temperature Compensation"^"Factory*"

It is noted that this is a short list of example hardware parameters chosen at random and is not to be construed to limit the present disclosure to these specific examples. Adapting the configuration of the UE 102 by setting preferred hardware parameter values can affect the performance of the UE 102, such as reducing or mitigating blocks and drops of calls. The hardware parameters may include CDMA timers, such as a buffer status report (BSR) timer.

Because the hardware parameters may significantly change the performance of the UE 102, access to the API of the physical application 116 customarily is restricted to the OEM. As taught herein, however, the carrier application 118 is authorized to access the API extended by the physical application 116 and changes or adapts hardware parameters to optimize the UE 102. The carrier application 118 may read a secure access credential 128 that is stored in the identity module 108 and provide the secure access credential 128 when invoking the API to change the hardware parameters. Alternatively, the physical application 116 may itself reach out to the identity module 108 to obtain the secure access credential 128 after receiving the API invocation from the carrier application 118 and before setting the hardware parameters. In either case, if the physical application 116 is able to validate the secure access credential 128, the requested hardware parameter value or values are set into the hardware.

The identity module 108 may be a removable module that comprises a smart card and/or secure element that stores the secure access credential 128 and protects the credential from being altered or compromised. The identity module 108 may be a subscriber identity module (SIM) card. The identity module 108 may be a universal integrated circuit card (UICC). The identity module 108 may be sold as a kit by a wireless communication service provider to promote migrating subscribers onto its wireless communication service. The user may remove any corresponding identity module 108 associated with a first wireless communication service provider and replace with the identity module 108 associated with the second wireless communication service provider to effectuate, at least in part, the service migration.

In an embodiment, the carrier application 118 may be stored in the identity module 108 and copied to the memory 106 when the UE 102 is migrated (e.g., after installing the removable identity module 108 and powering on the UE 102 after a power cycle). Alternatively, in an embodiment, the processor 104 may execute the carrier application 118 on the identity module 108 itself, for example in a smart card component of the identity module 108. Alternatively, the identity module 108 may store an address or uniform resource locator that the processor 104 can retrieve and download the carrier application 118 from during migration of the UE 102. Alternatively, the user of the UE 102 may download and install the carrier application 118 pursuant to instructions provided to migrate the UE 102. In an embodiment, the identity module 108 may not be removable and may be a virtual SIM or virtual UICC that is configured wirelessly during a migration of the UE 102 from a first wireless communication service to a second wireless communication service, for example in a retail store location of the second wireless communication service provider.

In an embodiment, a plurality of sets of preferred hardware parameter values may be stored on the identity module 108. The carrier application 118 may use one or more identity of hardware components (e.g., an identity of a radio modem chip, an identity of other electronic chips) to index into or to select one of the sets of preferred hardware parameter values stored on the identity module 108 for setting into the hardware components, for example by invoking the API of the physical application 116.

When the carrier application 118 executes, for example on the event of first installing the identity module 108 in the UE 102 or the event of updating the identity module 108 to associate to a different RAN and/or wireless communication service, the carrier application 118 may query the UE 102 (e.g., an operating system of the UE 102) to inventory the hardware components of the UE 102. For example, the carrier application 118 may determine the identities of the electronic chips that comprise the UE 102, for example the make and model and version of a cellular radio modem chip. This may referred to as obtaining an identity of the cellular radio modem chip or an identity of the cellular radio transceiver 110. The carrier application 118 may create a preferred hardware parameters values request message that it sends to a device management hardware parameters server 120 and a UE hardware parameters application 122 that executes on the server 120. The UE hardware parameters application 122 may use the information provided by the carrier application 118 (e.g., the identities of electronic chips of the UE 102) to access a set of preferred hardware parameters values from a parameters data store 124. The wireless service provider may have developed sets of preferred hardware parameters values for a plurality of different electronic chips that may be present in UEs 102 deployed in its network (e.g., a different set of preferred parameter values for each different combination of chips). The UE hardware parameters application 122 may access the set of preferred hardware parameters values not only based on the identities of electronic chips but also based on a service plan associated with the subject UE 102. The UE hardware parameters application 122 then returns the selected set of preferred hardware parameters values to the carrier application 118.

The carrier application 118 may invoke the API of the physical application 116 to set all of the hardware parameters of the UE 102 associated with values in the set of preferred hardware parameters values. If the set of preferred hardware parameters values does not contain values for some hardware parameters of the UE 102, the physical application 116 may leave those hardware parameter values unchanged. In an embodiment, the carrier application 118 may request current values of hardware parameters from the physical application 116, compare the current values of hardware parameters to the preferred hardware parameters values, and request the physical application 116 to change only those hardware parameter values where there is a difference between the current value and the preferred value for the subject hardware parameter value.

When the carrier application 118 has completed the adaptation of hardware parameters in this way, the carrier application 118 may report completion of hardware parameter adaptation to the UE parameter application 122. The UE parameter application 122 may, in response, send a message to a customer relationship management server 130 informing it of this adaptation of hardware parameters of the UE 102. The customer relationship management server 130 may analyze the wireless communication subscription plan associated with the UE 102 in the context of the model of the UE 102 and the adapted hardware parameters of the UE 102 to determine possible notifications to send to the UE 102. For example, the analysis may indicate that the UE 102 may be able to experience better, more enjoyable service in the new wireless service provider network by upgrading his or her wireless subscription plan. The analysis may indicate that the UE 102 can execute some mobile applications in the new wireless network that it could not execute before. The analysis may indicate that the UE 102 may profitably subscribe to a new service. One or more notifications may be sent to the UE 102 to present these recommendations.

Figure 2:
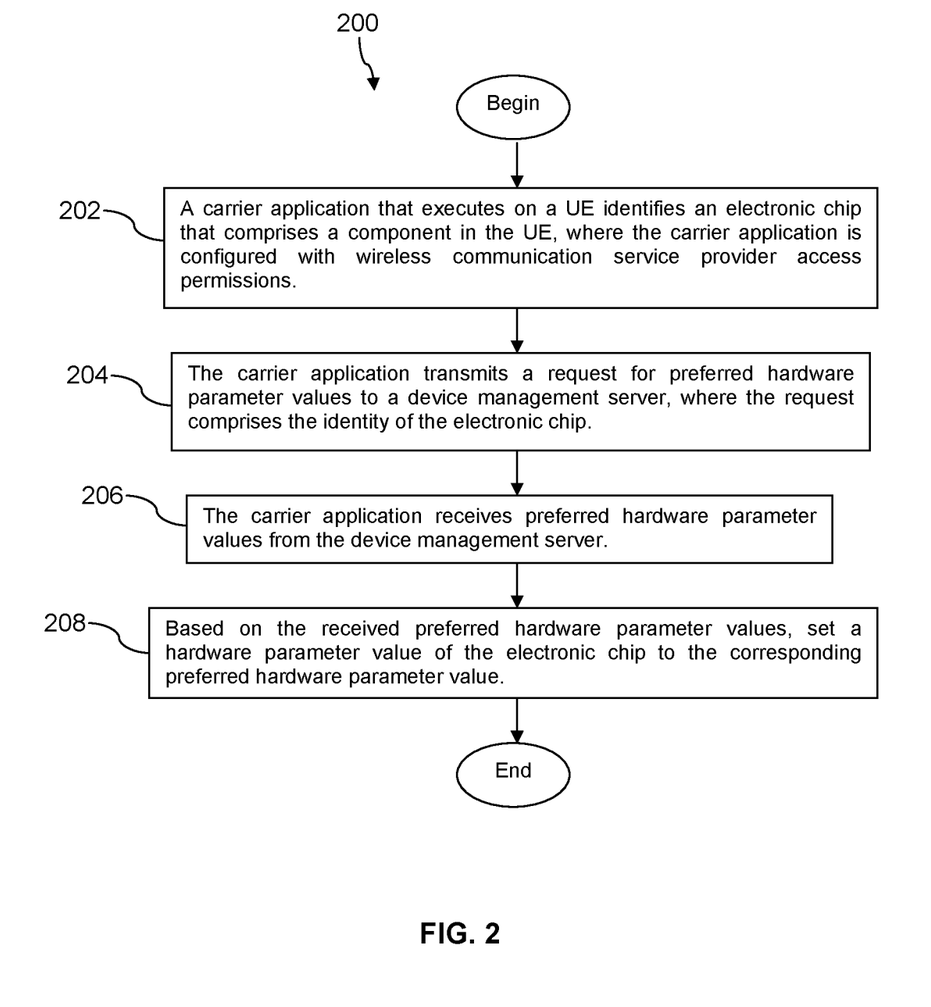
FIG. 2 is a flow chart of a method according to an embodiment of the disclosure.

In embodiment, if the identity module 108 is changed, after the initial execution of the carrier application 118, the carrier application 118 may cause the initial hardware parameters to be rest, for example to factory default values Turning now to FIG. 2, a method 200 is described. The method 200 may be used to configure a UE for improved or optimized wireless communication in a radio access network. At block 202, a carrier application that executes on a UE identifies an electronic chip that comprises a component in the UE, where the carrier application is configured with wireless communication service provider access permissions. At block 204, the carrier application transmits a request for preferred hardware parameter values to a device management server, where the request comprises the identity of the electronic chip. This request may comprise an identity of the UE 102, for example an international mobile equipment identity (IMEI) and/or an international mobile subscriber identity (IMSI). At block 206, the carrier application receives preferred hardware parameter values from the device management server. At block 208, based on the received preferred hardware parameter values, set a hardware parameter value of the electronic chip to the corresponding preferred hardware parameter value. The preferred hardware parameter value of the electronic chip may be set by the physical application 116, for example in response to the carrier application 118 invoking an API of the physical application 116. The physical application 116 may look up the secure access credential in a removable identity module 108 installed in the UE 102. Alternatively, the carrier application 118 may look up the secure access credential in the removable identity module 108 and provide that in its invocation of the API of the physical application 116 to set the hardware parameter value.

Figure 3:
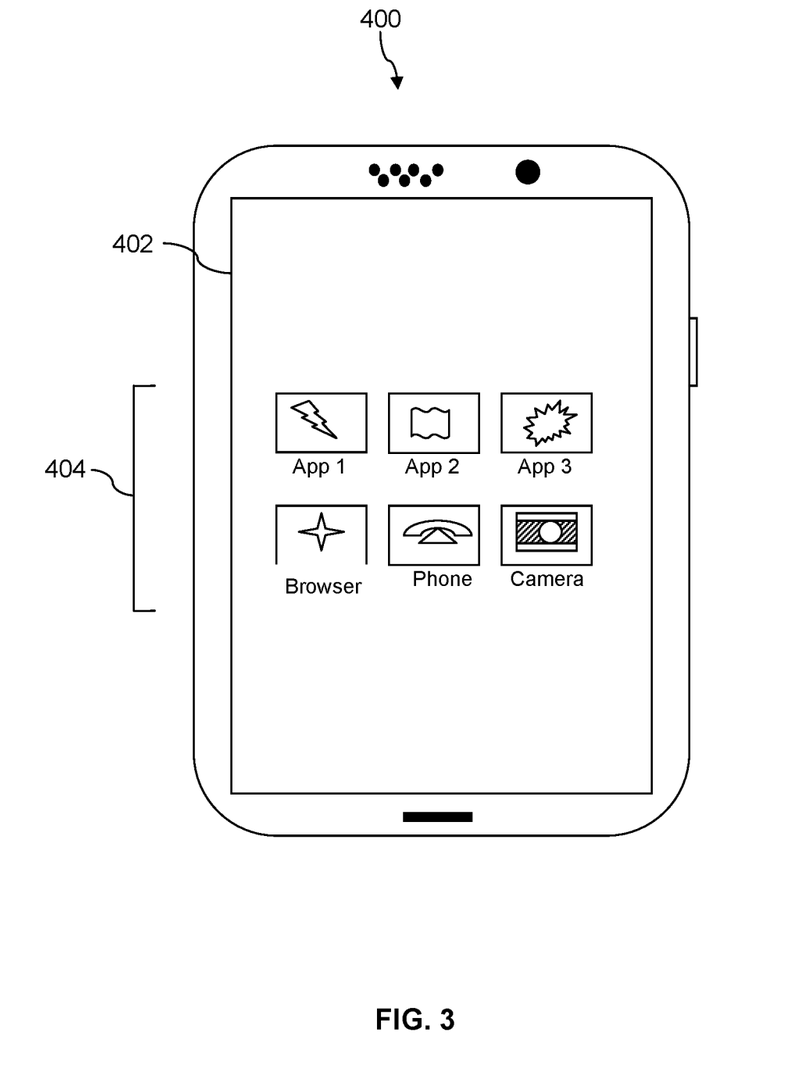
FIG. 3 is an illustration of a user equipment according to an embodiment of the disclosure.

FIG. 3 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 4:
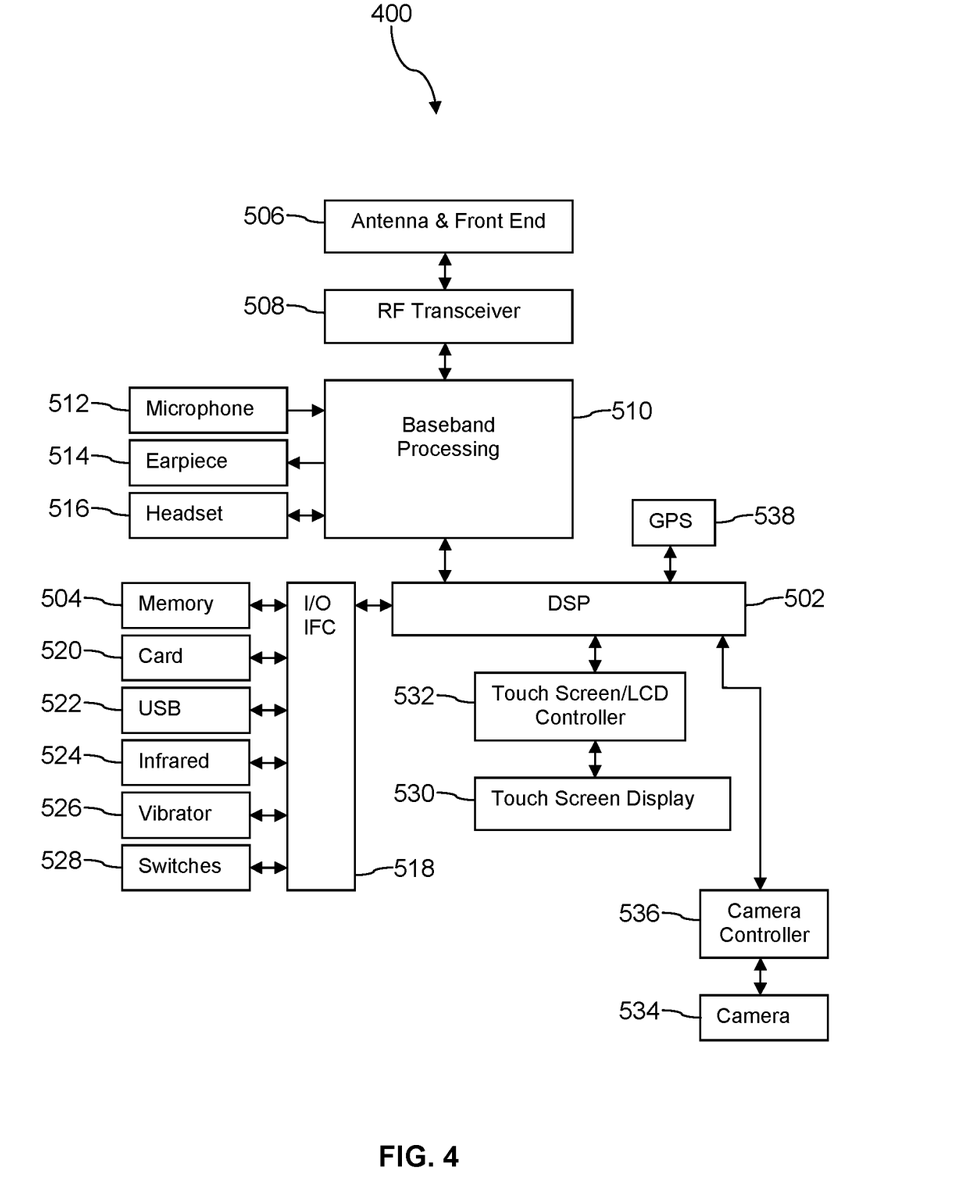
FIG. 4 is a block diagram of a hardware architecture of a user equipment according to an embodiment of the disclosure.

FIG. 4 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 5A:
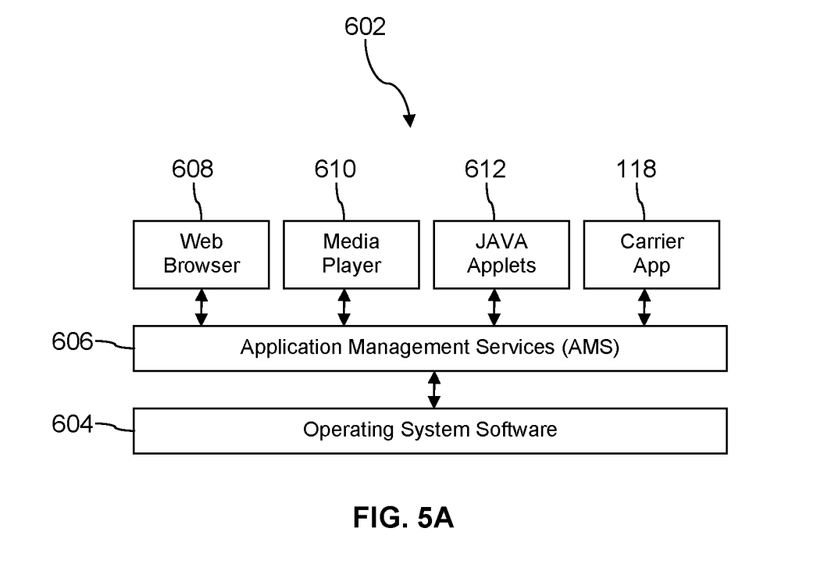
FIG. 5A is a block diagram of a software architecture of a mobile communication device according to an embodiment of the disclosure.

FIG. 5A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 5A are a web browser application 608, a media player application 610, and JAVA applets 612. In an embodiment, a third party application (e.g., the carrier application 614) may be installed on the mobile communication device 400. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 5B:
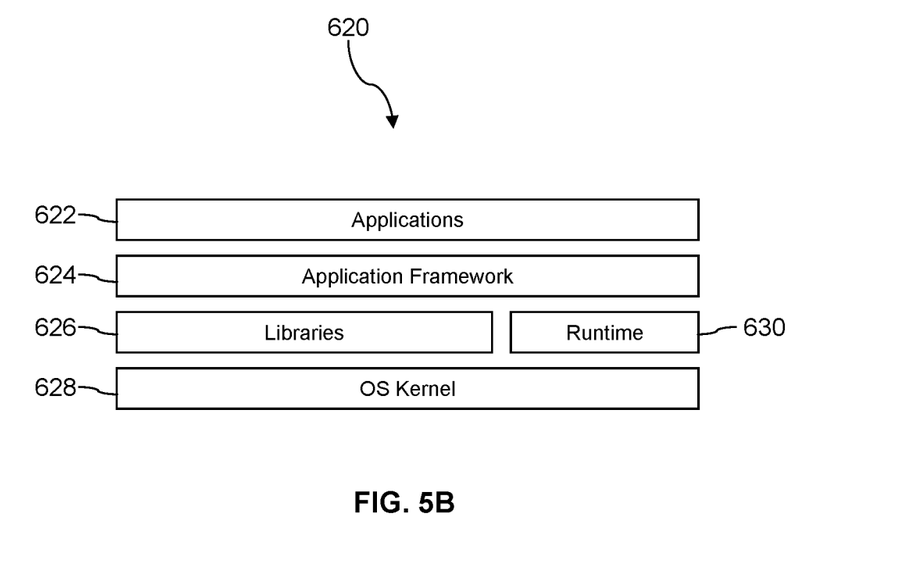
FIG. 5B is a block diagram of another software architecture of a mobile communication device according to an embodiment of the disclosure.

FIG. 5B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 6:
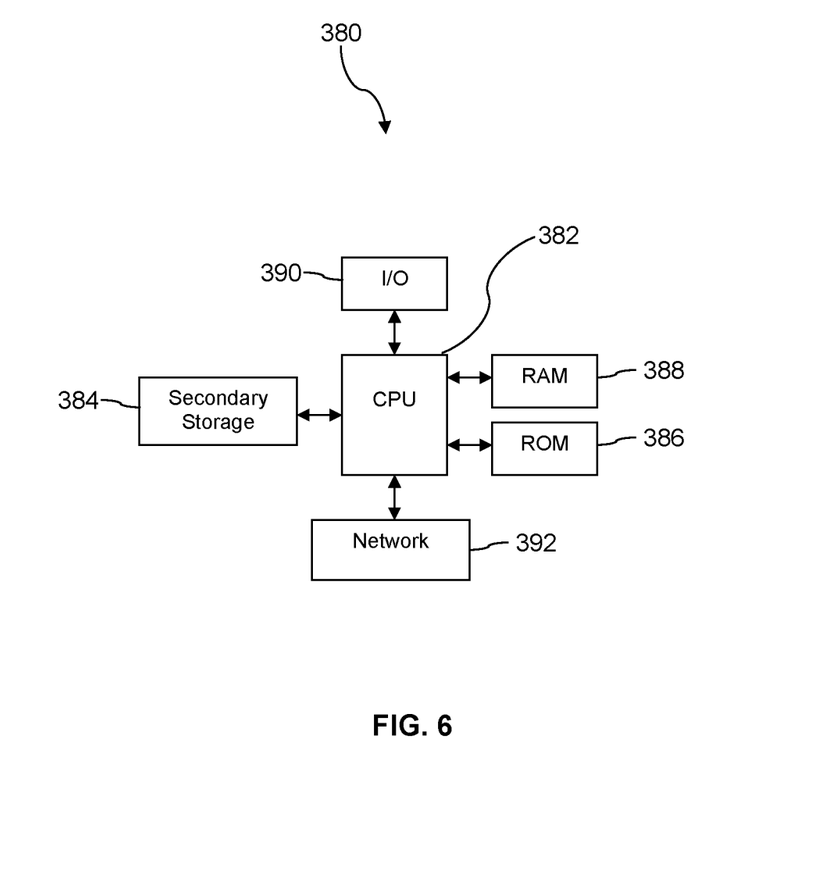
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application.

Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A user equipment (UE), comprising:
   a processor;
   a non-transitory memory;
   a cellular radio transceiver;
   a carrier application stored in the non-transitory memory that, when executed by the processor,
      determines an identity of the cellular radio transceiver in response to the UE being migrated from use in a first radio access network (RAN) to use in a second RAN,
      transmits a request for preferred hardware parameter values of the cellular radio transceiver for use in the second RAN via the cellular radio transceiver to a device management computer system, where the request for preferred hardware parameter values comprises the identity of the cellular radio transceiver,
      receives a set of preferred hardware parameter values of the cellular radio transceiver for use in the second RAN via the cellular radio transceiver, and
      sends a request to set a hardware parameter value of the cellular radio transceiver to a physical layer application, where the request comprises a preferred hardware parameter value and a secure access credential; and
   the physical layer application stored in the non-transitory memory that, when executed by the processor,
      receives the request to set the hardware parameter value of the cellular radio transceiver,
      authorizes the request to set the hardware parameter value based on validating the secure access credential, and
      sets the hardware parameter value to the preferred hardware parameter value identified in the request in response to validating the secure access credential.

2. The UE of claim 1, wherein the UE is one of a mobile phone, a mobile communication device, a smart phone, a media player, a personal digital assistant (PDA), a wearable computer, a headset computer, a laptop computer, a tablet computer, or a notebook computer.

3. The UE of claim 1, further comprising a removable identity module that stores the secure access credential, wherein the carrier application reads the secure access credential in the removable identity module and provides the secure access credential in the request to set the hardware parameter values that it sends to the physical layer application.

4. The UE of claim 3, where the removable identity module is one of a subscriber identity module (SIM) card or a universal integrated circuit card (UICC).

5. The UE of claim 1, wherein the preferred hardware parameter value comprises a value for a buffer status report timer.

6. The UE of claim 1, wherein the cellular radio transceiver is configured to establish a wireless communication link according to a long term evolution (LTE), a code division multiple access (CDMA), a global system for mobile communication (GSM), or a worldwide interoperability for microwave access (WiMAX) wireless communication protocol.

7. The UE of claim 1, wherein the carrier application transmits the request for preferred hardware parameter values to a device management hardware parameters server.

8. A method of configuring hardware parameter values of a user equipment (UE) after distribution to an end user, comprising:
   identifying an electronic chip that comprises a component in the UE by a carrier application that executes on the UE in response to the UE being migrated from use in a first radio access network (RAN) to use in a second RAN, where the carrier application is configured with wireless communication service provider access permissions;
   transmitting a request for preferred hardware parameter values for the second RAN to a device management server by the carrier application, where the request comprises the identity of the electronic chip;
   receiving preferred hardware parameter values by the carrier application from the device management server;
   authenticating, by a physical layer application, a request from the carrier application to change a hardware parameter value based on validating a secure access credential; and
   based on the received preferred hardware parameter values and in response to validating the secure access credential, setting, by the physical layer application, a hardware parameter value of the electronic chip to a corresponding preferred hardware parameter value,
   whereby the UE is configured for optimized wireless communication in the second RAN.

9. The method of claim 8, further comprising looking up, by the physical layer application, the secure access credential in a removable identity module installed in the UE.

10. The method of claim 8, further comprising looking up, by the carrier application, the secure access credential in a removable identity module installed in the UE, wherein the carrier application builds the secure access credential into the request it sends to the physical layer application to change the hardware parameter value.

11. The method of claim 8, wherein the request for preferred hardware parameter values further comprises an identity of the UE.

12. The method of claim 11, wherein the identity of the UE comprises an international mobile equipment identity (IMEI).

13. The method of claim 11, wherein the identity of the UE comprises an international mobile subscriber identity (IMSI).

14. A system, comprising:
   a removable electronic identity module, where the removable electronic identity module comprises an identity of a wireless communication service provider and a secure access credential; and
   a user equipment (UE), comprising:
      a processor;
      a non-transitory memory;
      a cellular radio transceiver;
      a carrier application stored in the non-transitory memory that, when executed by the processor, determines an identity of a cellular radio transceiver modem chip in response to the UE being migrated from use in a first radio access network (RAN) to use in a second RAN, obtains a set of preferred hardware parameter values or use in the second RAN via the cellular radio transceiver, and sends a request to set a hardware parameter value of the cellular radio transceiver modem chip to the cellular radio transceiver, where the request comprises a preferred hardware parameter value; and a physical layer application stored in the non-transitory memory that, when executed by the processor, receives the request to set the hardware parameter value of the cellular radio transceiver modem chip, authorizes the request to set the hardware parameter value based on validating the secure access credential, and sets the hardware parameter value of the cellular radio transceiver modem chip to the preferred hardware value identified in the request in response to validating the secure access credential.

15. The system of claim 14, wherein the removable electronic module is a subscriber identity module (SIM) card.

16. The system of claim 14, wherein the removable electronic module is a universal integrated circuit card (UICC).

17. The system of claim 14, wherein the removable electronic module further comprises a plurality of sets of preferred hardware parameter values, where the carrier application obtains the set of preferred hardware values by searching in the removable electronic module based on the identity of the cellular radio transceiver modem chip.

18. The system of claim 14, wherein the carrier application further transmits a request for preferred hardware parameter values via the cellular radio transceiver to a device management computer system, where the request for preferred hardware parameter values comprises the identity of the cellular radio transceiver modem chip, and wherein the carrier application obtains the set of preferred hardware parameter values by receiving the set of preferred hardware parameter values of the cellular radio transceiver modem chip via the cellular radio transceiver.

19. The system of claim 14, wherein the UE is one of a mobile phone, a mobile communication device, a smart phone, a media player, a personal digital assistant (PDA), a wearable computer, a headset computer, a laptop computer, a tablet computer, or a notebook computer.

* * * * *